UNITED STATES PATENT OFFICE.

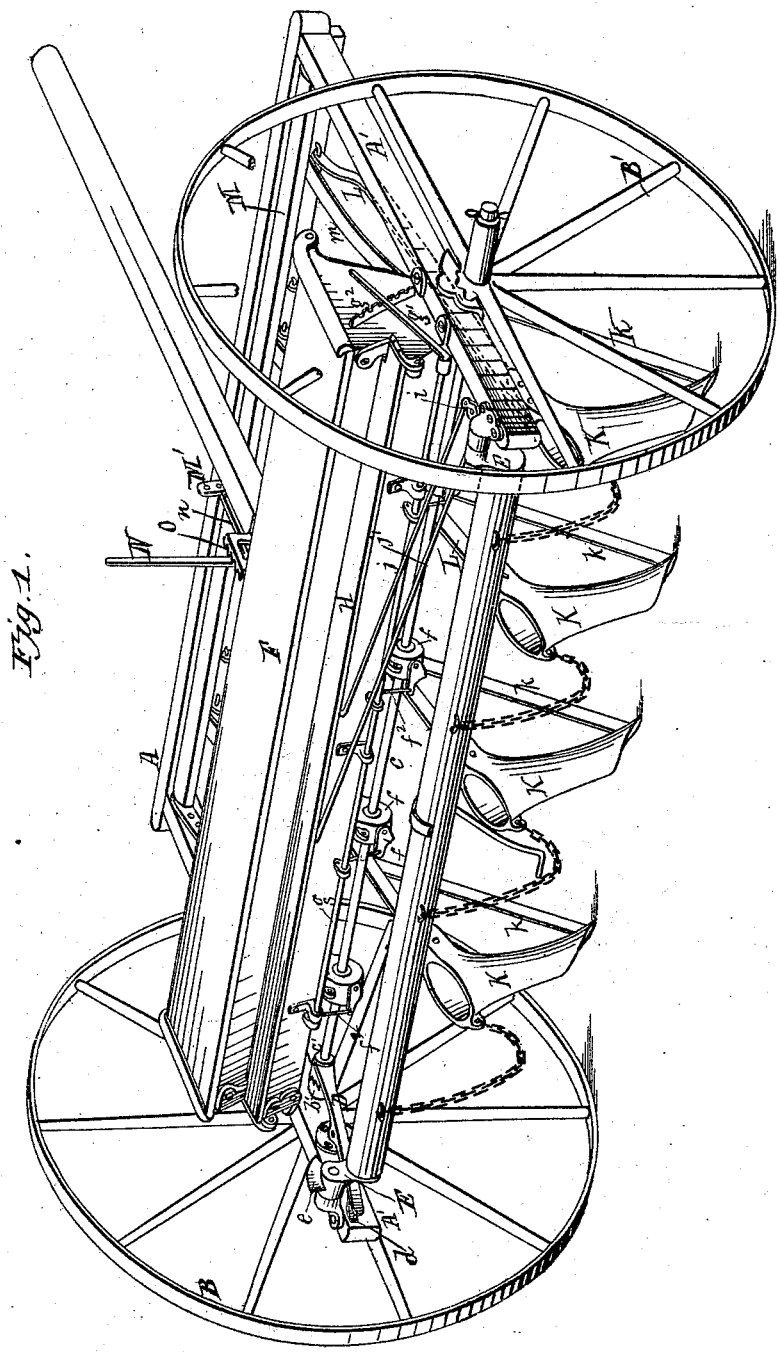

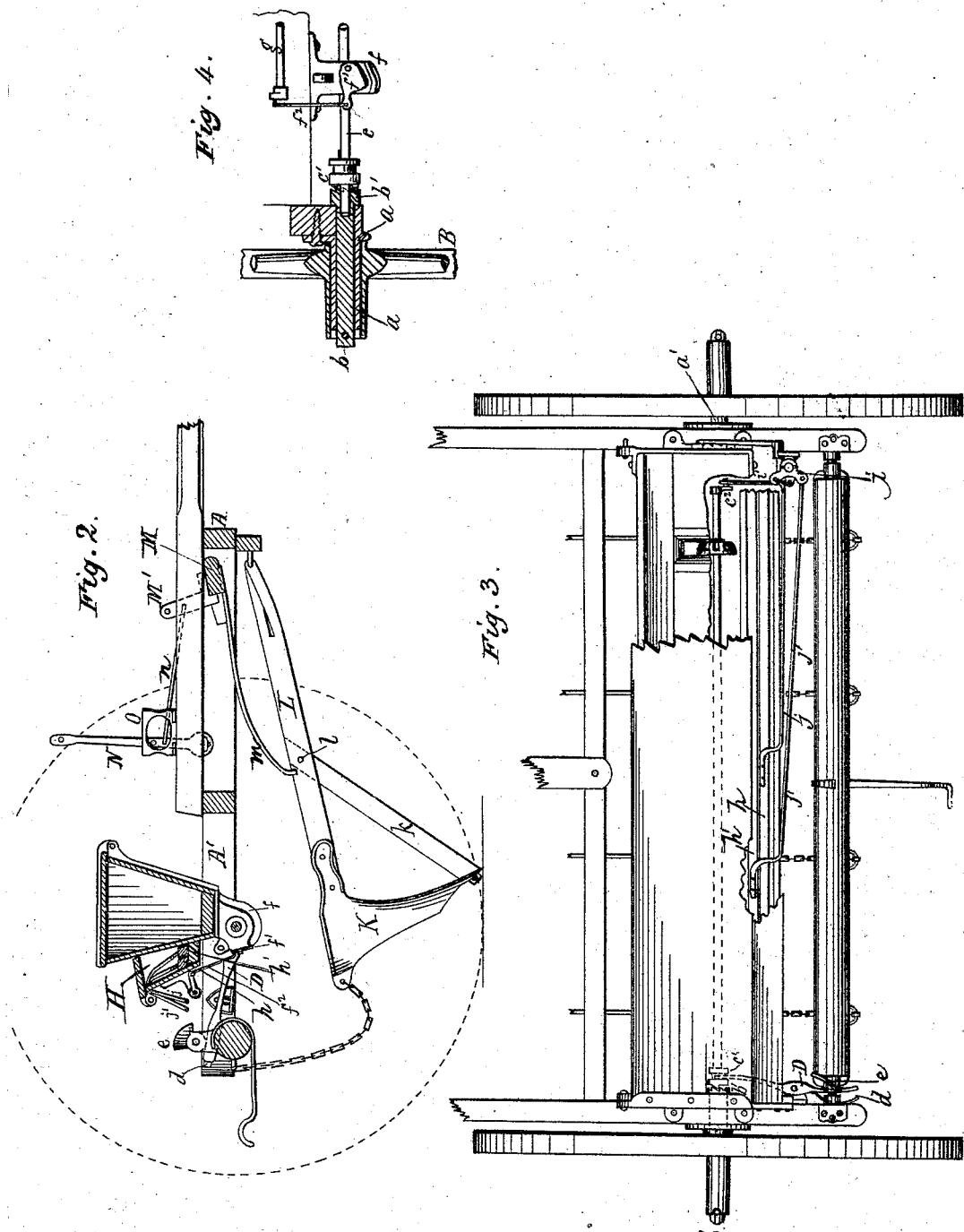

JOSHUA M. SMITH AND H. W. C. THOMAS, OF SPRINGFIELD, OHIO.

IMPROVEMENT IN GRAIN-DRILLS.

Specification forming part of Letters Patent No. 184,268, dated November 14, 1876; application filed February 26, 1876.

*To all whom it may concern:*

Be it known that we, JOSHUA M. SMITH and H. W. C. THOMAS, both of Springfield, county of Clarke, State of Ohio, have invented certain new and useful Improvements in Grain-Drills, of which the following is a full, clear, and exact description, reference being had to the accompanying drawings, making part of this specification, in which—

Figure 1 is a perspective view of a machine embracing our improvements. Fig. 2 is a vertical longitudinal section of the same. Fig. 3 is a plan view, with parts broken away for better showing the relation and arrangement of other parts; and Fig. 4 is a vertical section through the drive-wheel axle, showing the manner of connecting said wheel with the distributer-wheel shaft, and also showing one of distributer-casings in rear elevation.

Similar letters of reference denote corresponding parts wherever used.

Our invention relates, first, to the means for regulating the flow or discharge of the grain or seed by the distributers; second, to the arrangement of the distributer-wheel shaft, and the manner of combining it with the driving-wheel; third, to the manner of driving the grass-seed slides, all as hereinafter explained.

The machine, in its general organization and arrangement of parts, may be similar in construction to those now in use, and need therefore be described in detail only so far as is necessary to an understanding of our improvements.

In the accompanying drawings, A A' represent the rectangular main frame, of any suitable or preferred construction, A' representing the longitudinal side bars, which, near their rear ends, have short stud-axles $a$ $a'$ rigidly secured to them—that ($a$) upon which the drive-wheel B is mounted (or both, if preferred) being made in tubular or sleeve form, and affording a bearing for a short central shaft, $b$, which, as also the hub of wheel B, projects beyond the shaft $a$, and is connected with and made to rotate with the hub of the wheel by means of a pin or key, as shown in Figs. 3 and 4. The inner end of the shaft $b$ is provided with a hub, $b'$, which is also tubular or in sleeve form, to afford a bearing for the adjacent end of the distributer-wheel shaft $c$, arranged in line with the shaft $b$; and the end of the hub $b'$ has a clutch-face formed upon it, with which a sliding clutch, $c^1$, feathered on the shaft $c$, is made to engage for imparting motion to said shaft. The clutch $c^1$ is grooved, and a forked lever, D, engaging with said groove, is pivoted at or near midway of its length upon a bracket attached to the frame-timber A', in rear of the axle $a$, the rear end of said lever being operated upon by a spring at $d$, for holding the clutch $c^1$ engaged with the clutch $b'$. For throwing the clutch $c^1$ out of engagement with the clutch $b'$, and stopping the action of the distributer-wheel shaft, a cam, $e$, is formed upon the lifting-roller crank-arm E, opposite, or nearly so, to the roller, in such manner that, when the roller is rotated for raising the hoes out of the ground, the cam $e$ comes in contact with the rear arm of lever D, and, overcoming the tension of spring $d$, moves the clutch $c^1$ out of engagement with clutch $b'$, the spring $d$ reversing the movement of the lever and clutch, when the cam $e$ is withdrawn in again, lowering the hoes to their work.

The grain-hopper (represented at F) has secured to its bottom a number of distributer-wheel casings, $f$, made in any usual or preferred way, within which, and between the inclosed wheel and the casing, a channel is formed for the passage or discharge of the seed from the hopper F, the seed being forced through and out of said channels by the rotation of said wheels. At the discharging ends of each of these channels is placed a valve, $f^1$, pivoted at one end to the casing, and at its opposite swinging end connected by a link, $f^2$, with a crank-arm on a rock-shaft, $g$, mounted in suitable bearings at the rear of the grass-seed or grain box, as shown. This shaft extends transversely across the machine, and is provided with a series of crank-arms, corresponding to the number of distributers employed; and at one end said shaft has a lever, $g^1$, attached, which extends up within reach of the driver on box F, enabling him to adjust the valves $f^1$ simultaneously at will, and thus to regulate the amount of seed discharged, the lever being held at any desired point of adjustment by a rack, $g^2$.

The grass-seed hopper H is shown applied to the rear of the grain-box; but it may be placed in front thereof, if preferred, and has placed within it two reciprocating bars or stirrers, $h\ h'$, placed side by side, and extending longitudinally of the box or hopper, as shown in Figs. 2 and 3.

These bars may be provided on their under side with any usual or preferred form of stirring-fingers, and are designed to be reciprocated in opposite directions, as giving a greater regularity to the discharge of the seed with diminished speed of the slides, rendering the seed less liable to be injured.

The means employed for operating these slides is as follows: The end of shaft $c$ opposite the clutch $c^1$ is armed with a crank, $c^2$, from which motion is imparted through a rod, $i'$, to a bell-crank or two-armed lever, $i$, pivoted in a suitable bracket attached to frame A. (See Fig. 3.) The two arms of this lever, arranged on opposite sides of the vertical pivot, are connected, one with the slide $h$ by a bent rod, $j$, and the other with the slide $h'$ by a similar rod, $j'$. By this arrangement the reverse movement of the slides is obtained, and without the addition of any separate driving mechanism therefor, the same gearing which operates the distributer-wheel shaft serving also to actuate the grass-seed slides. The hoes or drill-tubes K are rigidly connected to the rear ends of drag-bar L, which, at their forward ends, are hinged to a transverse bar, connected with the frame in any usual or preferred way. From the toe or point of each hoe, and connected therewith through a slot and pin, or in some other convenient manner, is a knife bar or brace, $k$, which extends obliquely forward and upward to the drag-bar L, being connected therewith at $l$, as shown. This cutter serves to clear the path of the hoe, cutting through small roots, corn-stalks, &c., while at the same time bracing and stiffening the hoe attachment, and facilitating the movement of the hoe over obstructions too heavy to be removed from its path, and which would endanger the breaking of the hoe.

Over the pivoted forward ends of the drag-bars is pivoted a transverse rocking bar, M, to which a number of flat plate springs, $m$, are secured, the number of these springs corresponding to the number of the drag-bars. The rear ends of these springs are notched or forked to stride, and thus be held in place on the drag-bars, which are held down to their work with a regulated pressure, as follows: The bar M has an arm or lever, M', extending upward from it, provided with a series of perforations, with any one of which the forward end of a rod or link, $n$, may be engaged, the rear end of said link being connected with a lever, N, arranged within convenient reach of the driver. The lever is also provided with a series of perforations for varying the point of attachment of the link, for increasing the power of the lever or the throw of the rocking-bar M and springs $m$, as desired. The lever N is held at any desired point by means of a rack, O. The driver, by moving the lever N backward or forward, can increase or diminish the pressure of the springs $m$ on the drag-bars at will, according to the nature of the soil being operated upon, while by the arrangement of the springs as shown and described, each hoe is permitted to rise independently of the others, for surmounting an obstruction too heavy for it to remove out of its path.

Parts of the machine, such as the distributer-wheels, the conductor-spouts connecting the distributers with the hoes, the grass-seed-discharging devices, the lifting-roller, and the hoes, drag-bars, &c., which are not particularly described, may be constructed and arranged in any usual or preferred way.

Having now described our invention, what we claim as new, and desire to secure by Letters Patent, is—

1. The series of pivoted valves $f^1$, arranged over the discharge-outlets to the seed-runs of the distributer shells or casings, and operating substantially as described.

2. The series of pivoted valves $f^1$, arranged over the discharge-outlets of the distributer-wheel casing, in combination with the rock-shaft $g$, with its series of crank-arms, and actuating-lever $g^1$, substantially as and for the purpose set forth.

3. The hollow stud-axle $a$, in combination with the drive-wheel B, central shaft $b$, distributer-wheel shaft $c$, and clutch $b'\ c^1$, arranged as described.

4. The shaft on which the distributing-wheels are mounted, provided with the crank-arm, in combination with the reversely-reciprocating grass-seed slides, and the connecting-rods, arranged and operating substantially as described.

JOSHUA M. SMITH.
H. W. C. THOMAS.

Witnesses:
W. H. WILLIS,
IRA W. WALLACE.